United States Patent [19]

Johnson

[11] 4,196,502
[45] Apr. 8, 1980

[54] ROLLER WITH REVERSIBLE HUB FORMING INSERTS

[76] Inventor: Lawrence N. Johnson, W. 130 Highdrive, Spokane, Wash. 99203

[21] Appl. No.: 38,913

[22] Filed: May 14, 1979

[51] Int. Cl.² .............................................. B21B 13/02
[52] U.S. Cl. ................... 29/116 R; 414/529; 193/35 C; 280/414 R; 16/45; 403/4
[58] Field of Search .......... 403/4, 26; 29/110, 116 R, 29/125; 414/529; 193/35 C, 37 R; 280/414 R; 16/45

[56] References Cited

U.S. PATENT DOCUMENTS

| | | | |
|---|---|---|---|
| 1,619,590 | 3/1927 | Tanner | 16/45 |
| 1,855,316 | 4/1932 | Schacht | 16/45 |
| 2,724,858 | 11/1955 | Reichert | 16/45 |
| 2,933,328 | 4/1960 | McIntyre et al. | 280/414 R X |
| 2,987,746 | 6/1961 | Davis et al. | 29/116 R |
| 3,892,320 | 7/1975 | Moore | 280/414 R X |
| 3,917,087 | 11/1975 | Godbersen | 193/35 C |

Primary Examiner—Wayne L. Shedd
Attorney, Agent, or Firm—August E. Roehrig, Jr.

[57] ABSTRACT

A roller structure for supporting a boat on a trailer bed and having a pair of annular hubs in the form of a funnel-like insert member to mount the roller. Each insert member has an inner shaft engaging section and an outer roller engaging sections whereby the sections are axially offset from one another relative to the axis of rotation of the roller. The pair of insert members are snugged against the roller for support thereof in either of two alternative mirror image configurations. In one configuration the inner section pof the insert members are spaced apart and are remote of one another and the roller provides for generally non-gimbaling rotation on a supporting shaft. In the other configuration the inner sections are adjacent and substantially in abutment, and the roller achieves a gimbaling rotation on the shaft.

12 Claims, 3 Drawing Figures

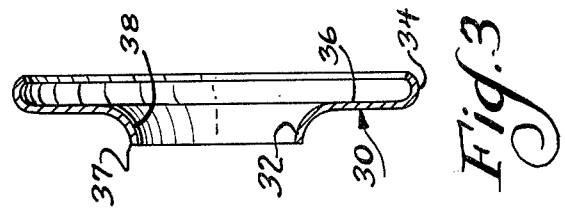
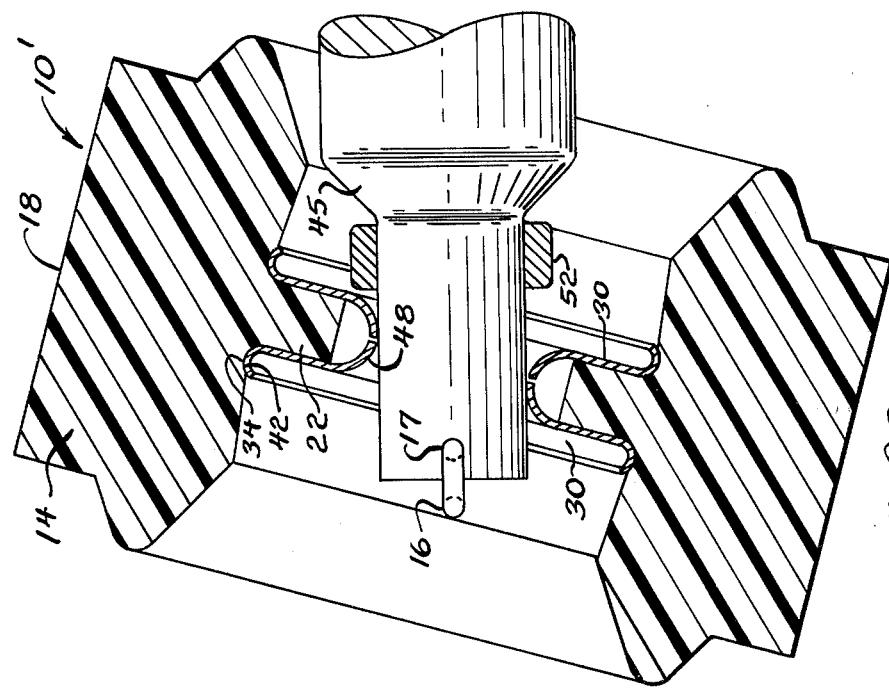
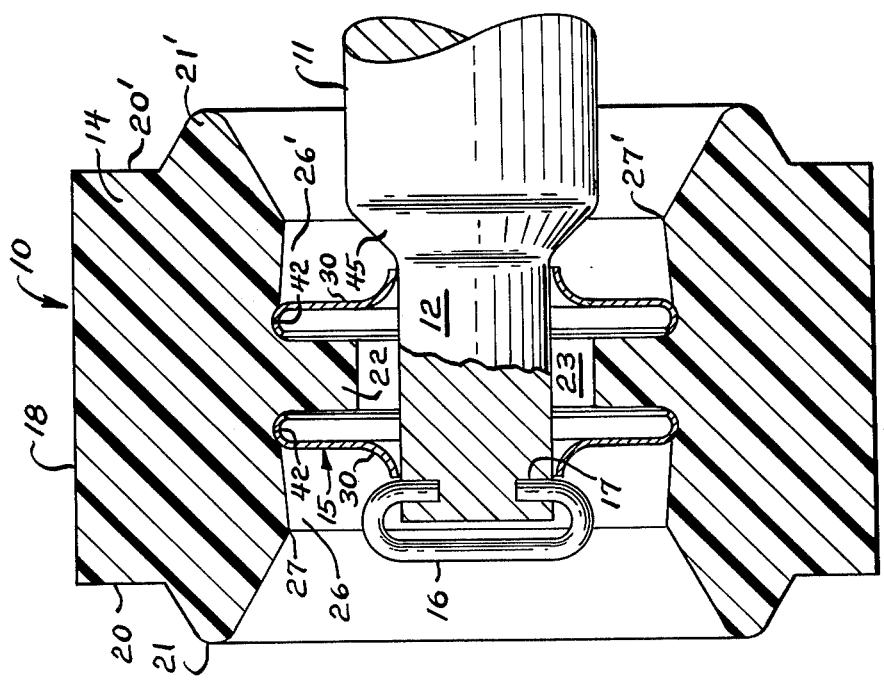

ROLLER WITH REVERSIBLE HUB FORMING INSERTS

BACKGROUND OF THE INVENTION

This invention relates in general to a boat support structure and, in particular, to an improved boat support structure permitting interchangeable gimbaling or non-gimbaling support of a roller on a shaft suitable for incorporation in a boat trailer or boat transporting vehicle structure.

A roller mounted rotatably on a shaft is frequently used to support an article that is moved over the roller in a direction crosswise to the shaft. Typically, the roller includes a generally cylindrical outer periphery and a hub structure connected to support the roller on the shaft. In many instances, the outer cylindrical periphery of the roller is coaxial of the center axis of the mounting shaft during roller rotation, and the roller moves in a plane normal to the shaft axis during such rotation without a wobbling effect.

In certain roller installations in support of boat structures, it is desirable to permit the roller to cant or tilt relative to the shaft during rotation, thereby angling the outer periphery of the roller relative to the center axis of the shaft. Through such cant support, the roller moves in planes angled other than normal to the shaft axis resulting in a wobbling effect. This latter action of the roller will be referred herein as gimbaling rotation while the maintenance of roller rotation in planes normal to the axis of the shaft will be referred to as non-gimbaling rotation.

Gimbaling rotation of a roller is advantageous where a boat hull of varying shape is moved over the support rollers of the trailer and the like while loading or unloading the boat into or from the water. Even when a relatively large number of rollers are used to support the boat, it is desirable to have each roller self-align to cause its tread to engage the hull across its full tread width, as compared to much smaller engagement along only an outer edge of the tread. A gimbaling roller thereby automatically self-aligns and allows the full tread to follow and engage the changing contours of the hull and thereby minimize stress concentrations of the hull.

On the other hand, it is frequently desirable, even in the same example of a boat trailer, to maintain certain rollers in a stable non-gimbaling position such as, for example, to increase the load carrying capacity of the rollers. Consequently, it can be advantageous in many installations to provide both non-gimbaling and gimbaling rollers, and allow the user to interchange such respective mountings as desired. Prior art roller supports require the user to resort to elaborate physical modifications requiring extra parts and tools to interchange such selective alternative mounting of respective rollers as needed.

SUMMARY OF THE INVENTION

It is, therefore, an object of the present invention to improve the versatility of a supporting device on a boat trailer or the like;

Another object of the invention is to support a supporting device on a boat trailer for alternate gimbaling or non-gimbaling movement in contact with a hull;

A further object of this invention is to permit conversion of the supporting device from gimbaling or non-gimbaling support to the other without requiring additional components;

Still another object of this invention is to permit conversion of the mounting of a selected supporting device through a simplified and effective technique.

These and other objects are attained in accordance with the present invention wherein there is provided a roller means mounted on a shaft by means of a two piece hub means to permit a non-gimbaling or a gimbaling mounting thereof. Such alternate roller mountings are possible using the same physical components, thereby providing that the roller mounting can be readily switched at the site of use with no complicated tools or personal expertise.

BRIEF DESCRIPTION OF THE DRAWINGS

FIG. 1 is a sectional view, as seen generally in longitudinal center section, of a supporting shaft rotatably mounting thereon a roller fabricated according to the subject invention and showing the roller in the non-gimbaling configuration;

FIG. 2 is a sectional view of the same roller components used in FIG. 1, except showing the shaft rotated 90° from that illustrated in FIG. 1 and further showing the roller components alternately arranged to illustrate the roller in a gimbaling configuration; and FIG. 3 is a sectional view of one of the hub members used in the roller constructions illustrated in FIGS. 1 and 2, where two identical hub members are required for either roller configuration.

DESCRIPTION OF THE PREFERRED EMBODIMENT

The boat supporting bed or frame of an all roller boat trailer is generally provided with a plurality of boat supporting rollers which are mounted thereon in spaced relation to support a boat and to facilitate loading and unloading the craft to and from the trailer. The rollers will vary in number and placement on the trailer bed depending upon the size of the craft and the contour of the hull with which the rollers will engage.

FIG. 1 illustrates a roller assembly 10 mounted to rotate about shaft 11, particularly at a reduced diameter, cylindrical end bearing section 12 of a shaft 11 coupled to a boat trailer. (not shown) The roller assembly 10 includes an annular roller body 14 and bearing inserts 15 mounted within the roller and fitted over the shaft bearing section 12. A split ring or locking member 16 is removably inserted into opposed openings 17 in the shaft and retains roller assembly 10 on bearing section 12.

Roller body 14 as illustrated includes a generally cylindrical outer peripheral surface or tread 18 and opposed side faces 20 and 20' whereby each of the roller faces include a protruding rib formation 21 and 21'. Roller body 14 is formed with an integral hub 22 having an axial bore 23 extending between pocket formations 26 and 26' which gradually decrease in diameter in an outward direction from the hub. Pocket formations 26 and 26' have entrance edges 27 and 27' from which the protruding rib formations 21 and 21' protrude. In the form of roller 14 which is illustrated in FIGS. 1 to 3, the roller body is rubber or a resilient elastomeric material of suitable hardness which is molded so as to provide a peripheral custion section at tread 18.

The bearing inserts 15 are in the form of two separate and substantially identical washer or insert members 30 having curved end sections. Each member 30 possesses an annular configuration in an approximate funnel-like form and has an inner peripheral curved section 32, an outer peripheral curved section 34, and an intermediate section 36 interconnecting the inner and outer sections. As best shown in FIG. 3, the end sections 32 and 34 are axially curved in opposite directions away from each other and in a preferred embodiment the radius of curvature of inner section 32 is greater than the radius of curvature of outer section 34.

The inner section 32 of insert member 30 includes a circular inner edge 37 that is only slightly larger than the diameter of the shaft bearing section 12. The inner end section 32 is curved from edge 37 forming a convex face 38 that in turn blends with flat intermediate section 36. The illustrated convex face 38 is formed having a common radius of curvature, although it is possible to have varying radii of curvatures, such as for example, in the form of a hyperbolic curve. The outer section 34 is adapted to fit snugly against the roller and to this end roller 11 is provided with a pair of circumferentially extending grooves 42 to receive the peripheral surface of outer section 34 for retention.

As illustrated outer section 34 has a symmetrical curved or curled configuration having a single radius of curvature to match the corresponding cross section of grooves 42. However, outer section 34 need not be formed with a smoothly curved configuration but could be formed with other configurations of which groove 42 may correspond in cross-section. It is advantageous in alternative curvatures or shapes that end sections 34 should be symmetrical to allow alternate positioning of hub member within the groove as will be apparent from the following description. Intermediate section 36 extends radially between the inner and outer sections when member 30 is in position to support roller 14.

Referring again to FIG. 1 there is illustrated the use of two identical insert members 30 mounting roller 14 in a non-gimbaling arrangement where the tread 18 remains generally concentric relative to the center axis of the shaft and the roller rotates in a plane substantially normal thereto. In this embodiment, sections 32 of the respective members 30 are directed in opposite directions away from hub 22 from which the intermediate sections 36 are spaced axially. Outer ends 34 are engaged within the roller grooves 42 to retain washer members in coupling relation to the roller. Thus, in this orientation of the insert members to each other, sections 32 embrace the shaft bearing section 12 and create a pair of spaced bearing surfaces along the length of the shaft which tends to maintain the roller 14 generally concentric of the shaft and prevent wobbling of the roller. The tangentially disposed ends 37 provide some surface contact of the hub means against the shaft to minimize component wear.

Under generally preferred conditions, the axial spacing on the bearing sections 12, between where the split ring 16 fits within openings 17 and shaft shoulder 45, is only slightly larger than the axial distance between edges 37 of the oppositely facing sections 32 of the members 30 as shown in FIG. 1. This allows free roller rotation while yet limits axial shifting of the roller on the shaft.

Referring to FIG. 2 there is illustrated the orientation of bearing inserts 30 by which roller 14 is mounted for a gimbaling or wobbling effect about shaft 11 when desired. Roller assembly 10' as shown in FIG. 2 includes the identical components as used in conjunction with the configuration of FIG. 1 with the exception that the orientation of insert members 30 are reversed with respect to each other. In such instance, curled inner end sections of the respective insert members are disposed in proximity to each other substantially in abutment. As a result, intermediate sections 36 of the insert members are closely adjacent roller hub 22 while the curve outer sections 34 are inserted for retention within the annular grooves 42 formed adjacent hub 22. By such an orientation a surface of revolution 48 is created by inner sections 32 of the insert which is inwardly bowed in the axial direction so as to provide a shaft bearing surface for obtaining a gimbal or wobbling effect in the mounting shown of roller 14.

In the connection with the roller mounting shown in FIG. 2 a spacer in the form of an annular sleeve 52 may be positioned on the shaft bearing section 12 to take up some of the axial bearing section length to thereby preclude excessive axial travel of the roller along the shaft. However, use of the sleeve 52 is optional and gimbaling roller 10' as illustrated in FIG. 2 would operate effectively with or without the sleeve. It is also optional to provide washers (not shown) on the shaft outwardly of the roller, but generally they are not needed except under unusual conditions.

From the foregoing, it should be apparent that the orientation of inserts members 30 as respectively shown in FIGS. 1 and 2 can readily be facilitated to alter the mounting of roller 14 as desired. For example, the roller is removed from the shaft merely by removing retention ring 16 from shaft engagement in openings 17. Thereafter, the separate insert members are removed from the roller and are repositioned therein in the reversed or mirror image positions. The roller and retention ring can then be positioned on the shaft for operation.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A roller structure for supporting a boat on a trailer or the like comprising:
   shaft forming means for carrying a boat supporting roller for rotational movement relative thereto,
   a roller body carried by said shaft forming means in a position to engage the hull of a boat when the boat is moved into supportive contact thereupon,
   said roller body including an axial bore for receiving said shaft forming means,
   shaft mounting means disposed in said axial bore to support the roller body for rotation on the shaft forming means,
   said shaft mounting means having a pair of annular members positioned in surrounding relation to the shaft forming means and coupled to the roller body,
   said annular members being positioned in a first orientation with respect to each other to mount the roller body for gimbaling rotational motion on the shaft forming means and positionable in a second orientation with respect to each other to mount the roller body for non-gimabling rotational movement in a plane substantially normal to the shaft forming means.

2. The roller structure of claim 1 wherein said annular members each including a curved inner peripheral section positionable adjacent said shaft forming means to form a bearing surface therefor.

3. The roller structure of claim 2 wherein said inner peripheral sections are curved away from each other axially of said shaft forming means in said second orientation.

4. The roller structure of claim 2 wherein said inner peripheral sections are curved toward each other axially of shaft forming means in said first orientation.

5. The roller structure of claim 4 wherein said inner peripheral sections include a respective edge substantially in abutment with each other in said first orientation.

6. The roller structure of claim 5 wherein the inner peripheral sections form a substantially continuous curved inner surface in said first orientation.

7. The roller structure of claim 2 wherein a portion of each of said inner peripheral sections contact said shaft forming means at spaced axial positions in said second orientation.

8. The roller structure of claim 2 wherein said annular members include an outer peripheral section having at least a portion thereof being retained to the roller body within said axial bore.

9. The roller structure of claim 8 wherein said roller body includes a pair of spaced grooves for receiving at least a portion of a respective outer peripheral section for retention.

10. The roller structure of claim 9 wherein said outer peripheral section includes a curved configuration.

11. The roller structure of claim 10 wherein said inner peripheral section of each of said annular members is curved in opposite direction than the outer peripheral section.

12. The roller structure of claim 1 further comprising sleeve means coupled to the shaft forming means adjacent one of said annular members to limit axial movement of the roller body in said first orientation of said annular members.

* * * * *